United States Patent [19]

Grigorenko

[11] 4,446,777
[45] May 8, 1984

[54] HAND-HELD BARBECUE SPIT
[76] Inventor: Donald C. Grigorenko, 3107 N. Star Ave., Columbus, Ohio 43212
[21] Appl. No.: 425,189
[22] Filed: Sep. 28, 1982
[51] Int. Cl.$^3$ .............................................. A47J 37/04
[52] U.S. Cl. ....................................... 99/419; 99/441; D7/106
[58] Field of Search ...................... 99/419, 421 A, 441; 211/59.1, 125

[56] References Cited

U.S. PATENT DOCUMENTS

| 555,952 | 3/1896 | Hofheimer | 99/419 |
| 2,183,938 | 12/1939 | Lewis | 99/419 X |
| 2,729,254 | 1/1956 | McLaughlin | D7/106 X |
| 3,164,180 | 1/1965 | Leopoldi | D7/106 X |
| 3,858,496 | 1/1975 | Downers | 99/419 X |

Primary Examiner—Billy J. Wilhite
Assistant Examiner—Christine A. Peterson
Attorney, Agent, or Firm—William S. Rambo; William Cates Rambo

[57] ABSTRACT

A hand-held spit for barbecuing or roasting weiners, sausages, chicken pieces and the like over an open fire includes an elongated metal, strap-like frame which supports a handle at one end thereof and which is formed at its opposite end with an annular loop on which is carried a plurality of quickly detachable, U-shaped, radially extending tines or skewers. The skewers are normally snap-fitted on the loop of the frame, but are easily removed therefrom for cleaning, packaging and/or storage.

7 Claims, 5 Drawing Figures

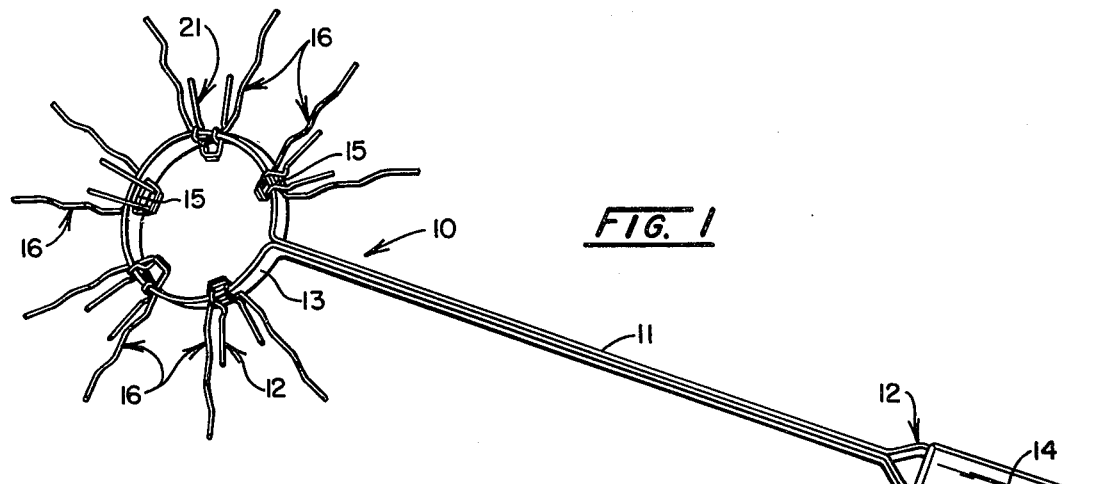
FIG. 1
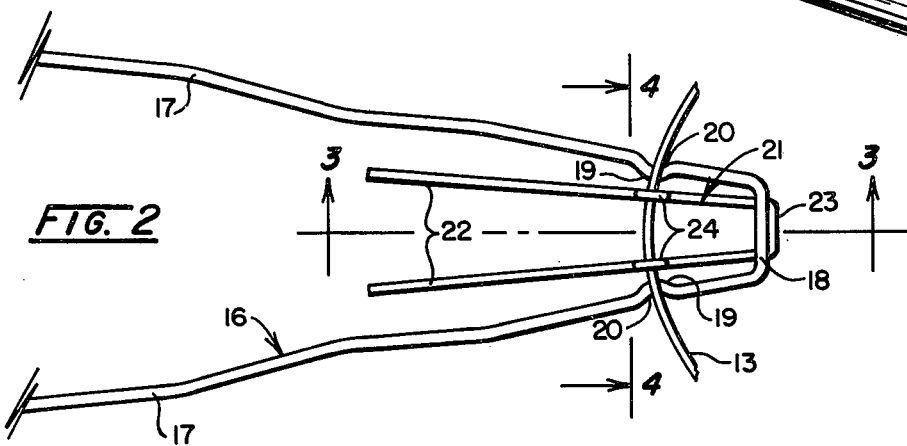
FIG. 2
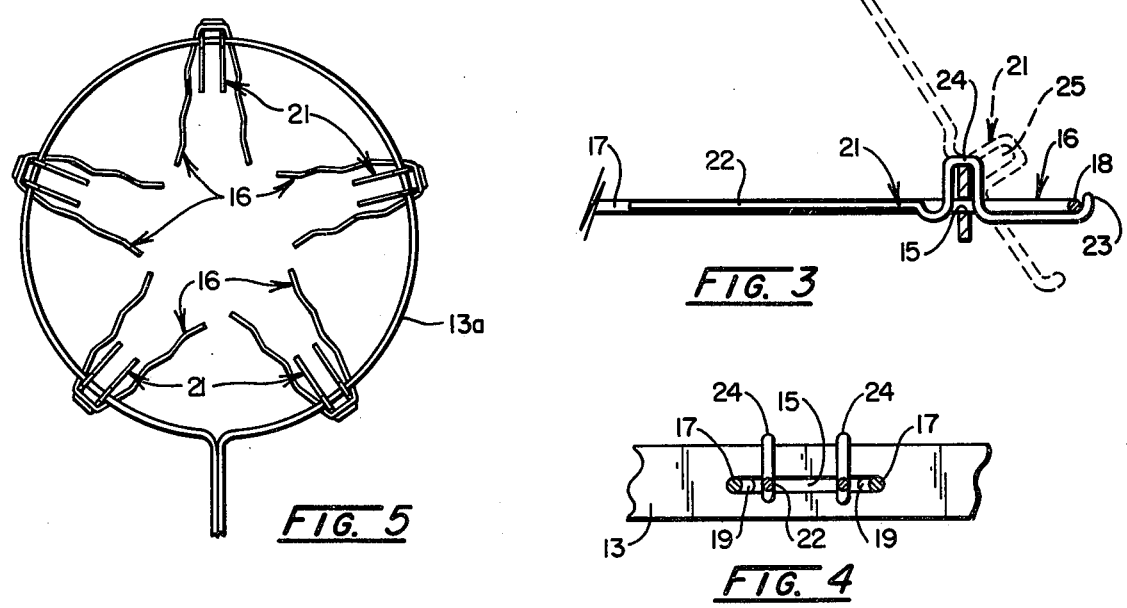
FIG. 5
FIG. 3
FIG. 4

HAND-HELD BARBECUE SPIT

BACKGROUND OF THE INVENTION

The present invention relates generally to cooking utensils adapted to hold food while exposing it to a source of heat, and more particularly to those utensils capable of supporting food over an outdoor fire and equipped with food-impaling tines.

In the past, hand-held barbecue spits capable of supporting numerous food items simultaneously have tended to be either unwieldy, undependable and/or difficult or clean. In fact, many outdoor cooks dispense with a hand-held, food-supporting utensil altogether and rely solely on a grill whose distance from the fire is adjustable only within a limited range, if at all. Absent a portable supporting device, however, one must employ some kind of poker or spatula to move each food item separately relative to the source of heat.

The closest prior art known to the inventor is disclosed in U.S. Pat. No. 2,183,938 issued Dec. 19, 1939 to Lewis.

The Lewis patent discloses a hand-held utensile whose elongated wire handle is detachably connected to a pair of disks between which are clamped radially outwardly projecting sets of U-shaped tines. In contrast, the present barbecue spit is equipped with pairs of tines that may be detached readily from a slotted, annular head or loop for ease in cleaning, storage and shipping. In addition, the open loop construction at the operative end of the spit minimizes the accumulation of grease and charred food particles.

SUMMARY OF THE INVENTION

The present hand-held barbecue spit comprises basically an elongated, substantially rigid frame formed at one end with a handle-supporting terminal and at its opposite end with an annular, tine-supporting loop; a handle carried by the handle-supporting terminal of the frame; and a plurality of generally U-shaped forks that are readily removable from the tine-supporting loop. The forks are carried demountably in relatively spaced apart openings formed in the tine-receiving loop and are formed with elongated, split-like prongs that extend generally radially from said loop.

Preferably, each of the U-shaped forks is resiliently flexible and is formed with a pair of relatively opposing, offset catches for springing engagement with portions of the loop bordering the tine-receiving openings. In addition, the present invention may be provided with a plurality of resilient clips, each of which is detachably connectable to the loop and is formed at one end with a fork-engaging detent and at its opposite end with a pair of stabilizing legs extending in spaced, generally coplanar relation to the prongs of said U-shaped fork.

A primary object of the present invention is to provide a hand-held barbecue split that is easily disassembled for cleaning and storage.

Another object of the present invention is to provide a hand-held barbecue spit capable of positively supporting a plurality of food items without becoming unwieldy.

Yet another object of the present invention is to provide a hand-held barbecue spit that facilitates the transfer of heat to the food impaled thereon and thereby reduces cooking time.

Further objects and advantages of the present handheld barbecue spit may become apparent following an appreciation of the following drawings and description of the invention.

BRIEF DESCRIPTION OF THE DRAWINGS

FIG. 1 is a perspective view of a hand-held barbecue spit according to the present invention;

FIG. 2 is an enlarged, fragmentary plan view showing one of the forks and an associated spring clip for detachably securing the fork to the end ring or loop of the spit frame;

FIG. 3 is a vertical sectional view taken along line 3—3 of FIG. 2;

FIG. 4 is a transverse vertical sectional view taken along line 4—4 of FIG. 2 and illustrating particularly one of the tine-receiving slots formed in the annular loop of the split; and FIG. 5 is a top plan view of a slightly modified form of hand-held barbecue spit according to the present invention.

DETAILED DESCRIPTION OF THE PREFERRED EMBODIMENT

FIG. 1 illustrates a presently preferred form of barbecue spit according to this invention. The spit includes an elongated, strap-like supporting frame indicated generally by the reference numeral 10. The frame 10 is preferably formed from a single strip of stainless steel which is machine rolled or otherwise bent to form an elongated, double thickness shank 11, a bifurcated handle-supporting terminal portion 12 at one end of the shank 11 and an annular fork or skewer-supporting loop or ring 13 at the opposite, outer end of the shank 11. The terminal portion 12 of the frame encompasses or boxes the grooved side edges of a wood or plastic block handle 14. The elongated, double thickness shank 11 may be, and preferably is, spot welded at spaced intervals therealong to rigidly join the opposite sides of the shank to one another and thereby rigidify the frame.

The ring or loop 13 of the frame is formed at circumfrentially spaced intervals with a plurality of radially opening, skewer or fork-receiving openings, preferably slots 15 (see FIG. 4). Demountably positioned in each opening or slot 15 is a generally U-shaped fork or skewer 16. Each of the forks 16 is preferably formed from a single piece of metal wire bent to form a pair of angularly divergent, wavy or corrugated prongs or tines 17 which are interconnected by a transverse base or bight portion 18. Each of the tines 17 is formed a distance outwardly from its bight portion 18 with an inwardly offset detent or corrugation 19 which defines a shallow groove or recess 20 in the outer side of the tine 17. The end walls of each of the slots 15 of the ring or loop 13 normally engage the detents 19 of each fork 16 to frictionally hold the forks against accidental removal from the slots 15 of the loop 13. However, each fork may be readily detached or demounted from the loop 13 simply by squeezing or resiliently flexing the tines 17 of each fork inwardly toward one another to free the detents 19 of the tines from engagement with the end walls of the slots 15 and thereby permit the fork 16 to be removed radially from the loop 13.

Preferably, each fork 16 is detachably locked to the ring or loop 13 by a generally hairpin-shaped spring clip 21. The spring clip 21, as best seen in FIGS. 2 and 3, consists of a generally U-shaped, integral piece of tempered steel wire formed with a pair of slightly angularly divergent legs or tines 22 interconnected by a transversely extending, vertically offset bight 23. Each of the legs 22 of the clips 21 is formed a distance outwardly from the bight 23 with a vertically offset detent or bend 24 which defines a downwardly opening recess 25 arranged to fit over and embrace the ring loop 13.

When operatively positioned, as shown by full lines in FIGS. 2-4, the bight 23 of each clip 21 hooks behind and frictionally engages the bight portion 18 of the adjacent fork 16 and the bends 24 of the legs 22 of the clip snap over and frictionally embrace the ring or loop 13 to thus lock the fork 16 and clip against accidental detachment or removal from the loop 13 of the frame 10. In their operative locking positions, the legs 22 of the clips 21 extend radially outwardly from the loop 13 in generally parallel, spaced relation to the tines 17 of the forks. The legs 22 thus form auxilliary, stabilizing skewers or tines which may penetrate and prevent undesired rotation of a hotdog, sausage, or other piece of food skewered on the tines 17 of the fork 16.

FIG. 5 of the drawing illustrates a slightly modified arrangement in which the annular loop or ring 13a of the frame of the barbecue spit is of slightly larger diameter than the ring 13 to permit the forks 16 and spring clips 21 to be arranged selectively to project either radially inwardly or radially outwardly with respect to the ring 13a. Thus, when it is desired to barbecue a comparatively large, heavy piece of meat, for example a whole chicken, the selected piece of meat may be placed within the ring 13a and skewered on the radially inwardly projecting forks 16 and clips 21.

When it is desired to remove the forks 16 and clips 21 from the ring 13 to facilitate cleaning, packaging and/or storage of the split, the legs 22 of the spring clips are lifted upwardly (see FIG. 3) to disengage the bends 24 from the ring 13 and simultaneously disengage the hook-shaped bights 23 from behind the bight portions 18 of the forks 16. The clips 21 may then be passed between the legs or tines of the forks and separated entirely from the assembly. Next, the forks 16 may be removed from the ring 13 simply by squeezing the outer ends of the tines 17 toward one another to disengage the detents 19 from the walls of the slots 15 and permit the forks to be withdrawn radially from the ring 13.

In view of the foregoing, it will be seen that the present invention provides an unusually sturdy, yet versatile, knockdown-type of hand-held barbecuing spit which is comparatively easy to assemble and to disassemble to facilitate cleaning, packaging and storage.

While presently preferred embodiments of the invention have been illustrated and described in detail, it is to be understood that various modifications in details of construction and design are possible without departing from the spirit of the invention or the scope of the following claims.

I claim:
1. A hand-held barbecue spit comprising:
   (a) an elongated, substantially rigid metallic frame provided at one end thereof with a handle-supporting terminal and at its opposite end with an annular, fork-supporting loop, said loop being formed with a plurality of relatively spaced apart fork-receiving openings;
   (b) a handle carried by the handle-supporting terminal of said frame; and
   (c) a plurality of generally U-shaped forks extending through said loop, demountably carried in the openings of said loop and formed with elongated, spit-like tines extending generally radially of said annular loop.

2. A hand-held barbecue spit according to claim 1, wherein each of said U-shaped forks is provided with relatively opposing, offset catches formed in said tines for frictional engagement with opposite walls of the tine-receiving openings of said loop.

3. A hand-held barbecue spit according to claim 1, wherein said frame is formed from a single continuous strip of metal.

4. A hand-held barbecue spit according to claim 1, including a plurality of spring clips frictionally engagable with the loop of said frame and with said forks and operable to lock said forks to the loop of said frame.

5. A hand-held barbecue spit according to claim 1, wherein the tines of said forks extend generally radially outwardly from said annular loop.

6. A hand-held barbecue spit according to claim 1, wherein the tines of said forks extend generally radially inwardly of said annular loop.

7. A hand-held barbecue spit according to claim 4, wherein each of said spring clips includes a pair of tines for disposition along side the tines of said forks.

* * * * *